Sept. 28, 1965  R. O. HULBERT  3,208,768
MATERIAL HANDLING APPARATUS
Filed March 12, 1963
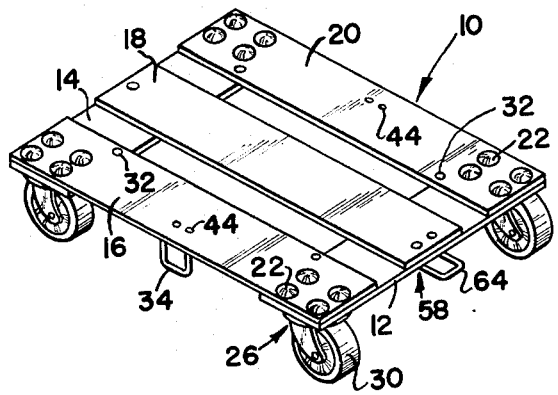
FIG_1
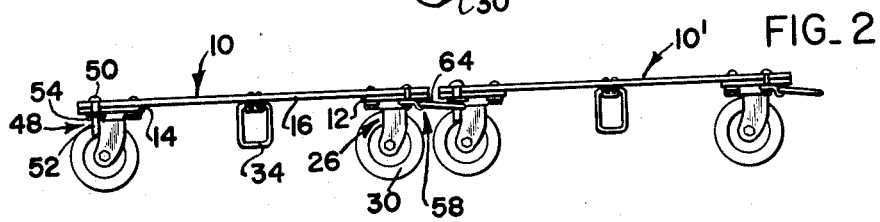
FIG_2
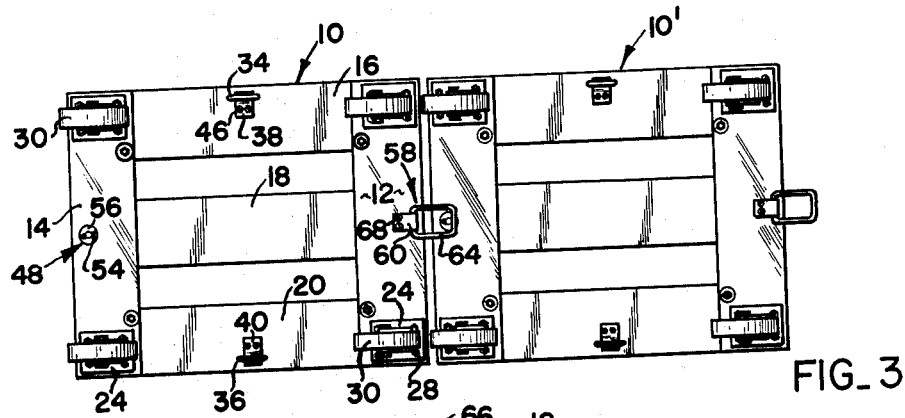
FIG_3
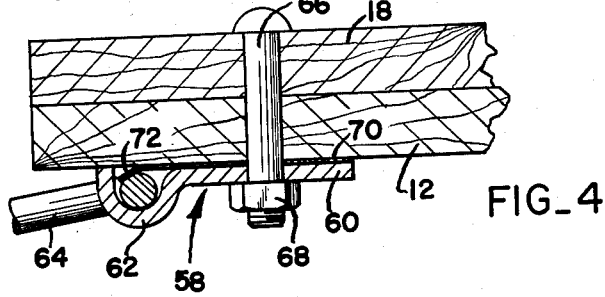
FIG_4
INVENTOR.
REED O. HULBERT
BY
Oberlin, Maky & Donnelly
ATTORNEYS

United States Patent Office 3,208,768
Patented Sept. 28, 1965

1

3,208,768
MATERIAL HANDLING APPARATUS
Reed O. Hulbert, Ashtabula, Ohio, assignor to The Smash-Proof Company, Inc., Ashtabula, Ohio, a corporation of Ohio
Filed Mar. 12, 1963, Ser. No. 264,620
5 Claims. (Cl. 280—408)

This invention relates in general to material handling apparatus and, more particularly, to an improved movable truck or dolly of the type in general use in the handling of food products in containers and the like.

In supermarkets, warehouses, bakeries and similar environments, for example, material or article handling forms an important and costly phase of the overall marketing operation, and wheeled trucks or dollies are in frequent use for moving articles loaded thereon relatively short distances. In present truck or dolly constructions, there are generally portions thereof or attached articles of hardware which project upwardly from within the top surface area, with these provided for moving the truck or dolly by hand or by use of a suitable tool or to couple a pair of such trucks for movement together. Such upwardly extending projections materially restrict the effective size of the area capable of receiving articles loaded on the truck or dolly and, to the extent serving as coupling devices, they may require exacting alignment of the two to be coupled thereby, again possibly restricting loading area.

A primary object of the present invention is to provide an improved truck or dolly construction having a substantially flat, completely unobstructed article supporting top-surface.

A further object of the present invention is to provide in such dolly construction coupling means associated therewith for quickly and easily coupling the truck or dolly with a similarly constructed dolly at either end, whereby a train of such dollies can be formed.

It is also an object to provide such dolly construction in which means are provided for readily effecting, as desired, individual movement of a dolly from such a coupled train.

Yet another object of the present invention is to provide a truck or dolly the construction of which enables a relatively large number of such trucks or dollies to be stacked one on top of the other during periods of non-use, such stack occupying a minimum of space.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view of a dolly constructed in accordance with the present invention;

FIG. 2 is a side elevational view showing a pair of such dollies coupled together;

FIG. 3 is a bottom plan view of the coupled dollies; and

FIG. 4 is an enlarged fragmentary view of the female coupling assembly.

Referring now to the drawings, wherein like parts are designated by like reference characters, there is generally indicated at 10 the material handling apparatus of the present invention, such apparatus being commonly referred to in the field of use as a truck or dolly and, to provide consistency, the latter term will be used hereinafter. The dolly 10 is generally rectangular and comprises transversely extending end frame members 12 and 14 and longitudinally extending frame members 16, 18 and 20 disposed above and rigidly secured thereto to form a rigid body having a completely exposed upper load-supporting surface. Both the longitudinal and transverse frame members are preferably formed from hardwood, although as will be apparent the particular material used is not essential to the present invention. The frame members 16, 18 and 20 are connected to the transverse frame members 12 and 14 at the corners of the body by means of a plurality of securing bolts 22, there being four such bolts at each corner in the form shown, which extend through openings in the respective longitudinal and transverse frame members and thence through a rectangular metal plate 24, referring to FIG. 3, which is the base part of a caster unit generally indicated at 26. Nuts 28 are threaded on the mounting bolts for securing the caster unit to the body. Each such caster unit 26 includes the usual ground-engaging swivel roller 30 for accommodating movement of the dolly in any direction. The caster unit is commercially obtainable and forms no part of the present invention, so that further description thereof is not essential for a full understanding of the present invention.

The intermediate longitudinal frame member 18 is secured at both ends thereof to the transverse end frame members 12 and 14, and the frame members 16 and 20 are additionally secured thereto by nut and bolt means which have been commonly designated at 32. The connection of the frame member 18 is further rigidified through the mounting of coupling members disposed at the body ends, as will be hereinafter specifically described. Thus far described, then, the dolly comprises a rigid rectangular body on swivel casters at the corners thereof, wherein the top surface of the dolly is completely exposed and available for convenient loading thereon.

The dolly 10 further includes, in the illustrated embodiment, freely swingable, substantially rectangular loop members 34 and 36 secured to the undersides of the longitudinal body frame members 16 and 20, respectively. Such loops are loosely held for swinging movement in mounting plates 38 and 40 of identical construction. The plates 38 and 40 are formed with semi-cylindrical loop-retaining portions for receiving the respective links 34 and 36 freely therein, as will be further noted below with particular reference to FIG. 4. Each mounting plate is secured to the underside of the associated body member by means of mounting bolts 44 which extend through the same and have nuts 46 to hold them rigidly in place. Due to the above described loose accommodation of the loops 34 and 36 in their respective mounting plates 38 and 40, the loops 34 and 36 normally hang downwardly for ready engagement by a suitable pulling tool such as the usual steel hook used for effecting dolly movement. Thus, in the present invention, the loops 34 and 36 enable such a handling member to be manually engaged with the dolly at either side thereof for moving the same in a generally lateral direction.

As above stated, an important aspect of the present invention is the provision of means for coupling a plurality of dollies together to thus form a train of such dollies for simultaneous movement thereof. For achieving such coupling of adjacently disposed dollies, the dolly 10 is provided with male and female coupling members, the male coupling member being generally indicated at 48 and comprising a head 50 at the top surface of one end of the longitudinal frame member 18 and a shank portion 52 which extends downwardly through the frame members 18 and 14. The male coupling member 48 is maintained in its operative position in the form shown by means of a cotter key 54 which extends through a transverse opening in the shank 52 beneath member 14 in the usual manner. A washer 56 is preferably interposed between the cotter key and the bottom of this end frame member 14. As can be seen in FIG. 2, the male coupling 48 extends substantially below the bottom of the dolly body and, as will be hereinafter described, is adapted to engage a female coupling member provided at an end of an adjacently disposed dolly.

The female coupling member generally referred to above is of course disposed at the end of the dolly opposite to the male coupling 48 and is generally indicated at 58, referring to FIG. 4. With one exception, the female coupling member 58 is similar to the pull loops 34 and 36 at the dolly sides of the mounting plates 38 and 40 therefor, with such coupling member comprising a like mounting plate 60 having a loop-receiving portion 62 formed therein for loosely receiving a rectangular loop member 64. The loop-receiving portion 62 is also semi-cylindrical and the mounting plate 60 is similarly mounted against the underside of the transverse frame member 12 by means of bolts 66 and securing nuts 68. This female coupling differs from the loop assemblies at the sides of the dolly in that there is additionally provided a flat steel spring clip 70 which is interposed between the underside of the transverse frame member 12 and the adjacent surface of the mounting plate 60, there being two openings formed in such steel clip through which the bolts 66 extend. The steel clip 70 is formed with an obliquely directed end portion 72 which resiliently firmly bears against the enclosed portion of loop 64. In this manner, the spring clip 70 continuously biases loop 64 against the enclosing portion 62 of the mounting plate 60, with such biasing action serving frictionally to maintain the loop 64 and in various angular adjusted positions to which it may be relatively moved. The biasing force of the spring clip 70 will of course not be of such magnitude as to prevent such manual adjustment of the loop 64. Thus, the loop 64 can be quickly and simply moved to a position entirely beneath the dolly or to a position projecting outwardly from the end of the dolly, the latter such condition being shown in FIGS. 1–4. When the dolly 10 is used alone, the female coupling member 58 can function similarly as the side loops 34 and 36, whereby the dolly 10 can be easily moved by engagement of the loop 64 with a suitable handling hook and the like as previously noted.

When it is desired to couple two of the dollies together, the loop 64 of the female coupling 58 is moved to its nonprojecting position, if not in such position at the time. The second dolly, which is similarly constructed and accordingly has been designated generally by reference character 10', to which dolly 10 is desired to be connected, is then brought into end-to-end adjacency to dolly 10, with the male coupling end of the dolly 10' being proximately opposed to the female coupling end of the dolly 10. A slight space, preferably on the order of one-half inch, is maintained between the adjacent ends of the dollies 10 and 10' to enable a conventional handling hook to be inserted downwardly between them for actuating the loop 64 to its substantially horizontal extended position, the loop 64 thus moving to surround or enclose the shank of the opposed male coupling member, as shown in FIGS. 2 and 3. The spring 70 maintains the loop 64 in its such adjusted condition whereby the dollies remain coupled until subsequent actuation to break this coupling. It will thus be noted that the coupling can be effected entirely from above the dollies in an extremely simple manner. In the same manner a third dolly can be disposed at either end of the two dollies 10 and 10' and the above described coupling procedure similarly followed. As will be apparent, any desired number of dollies can be coupled together in this manner for simultaneous movement or, in other words, to form a train therefrom. To break any such coupling, the loop of the female member is merely moved downwardly below the shank of the male coupling member engaged by the same.

Since it is necessary to properly orient the adjacently disposed dollies end-to-end for purposes of coupling the same additional distinguishing identification of the ends can be provided. Any suitable means for identification could be used, for example, painting the edge of the female coupling ends of the dollies a different color than the male coupling ends would provide an easy means for identification and proper orientation even with the top surfaces obscured by loads thereon.

The construction of this dolly enables any number thereof to be stacked to occupy a minimum of space. For example, assuming the dolly 10 illustrated in FIG. 1 to be the bottommost dolly, the second dolly can be inverted and placed on the dolly 10 to provide a flat top-to-top support. A third dolly can then be placed transversely over the second dolly, the rectangular shape of the dollies accommodating such placement without the interference by the casters. A fourth dolly can then be inverted and placed upon the third dolly, and so forth.

It will thus be seen that the present invention provides a material handling dolly of extremely simple and economical construction which provides a fully exposed top surface to facilitate loading thereon. With regard further to the matter of economy, the loop-mounting bracket assembly disclosed both at the sides and for one of the couplings of the dolly has particular advantages over available units or hardware which might be adaptable to the same general purposes. In respect of the coupling action, moreover, the rectangular form of loop in relation to the form of the male connector provides considerable flexibility or tolerance in the sense of eliminating need for the two dollies to be coupled to be in anywhere near exact alignment, which is a distinct advantage in the environments and under the use conditions contemplated and discussed.

Other modes of applying the principle of the invention may be employed, change being made as regards the details described, provided the features stated in any of the following claims or the equivalent of such be employed.

I therefore particularly point out and distinctly claim as my invention:

1. A material handling dolly comprising a generally rectangular body having a completely exposed top surface for loading thereon, ground-engaging casters secured to the underside of said body, whereby said dolly can be moved in any direction, a male coupling member at the underside of said body and depending downwardly therefrom at one end thereof, a female coupling member pivotally mounted on the opposite end of said body on the underside thereof, said female coupling member being swingable from a position entirely beneath said body to a position wherein a portion thereof extends outwardly of said body, whereby said female coupling member is adapted to receive a male coupling member of an adjacently disposed, similarly constructed dolly for coupling the pair of dollies together for simultaneous movement.

2. The combination of claim 1 wherein said female coupling member includes biasing means associated therewith for maintaining said female coupling member in adjusted angular positions relative to the body of the dolly.

3. The combination of claim 2 wherein said female coupling member includes a generally rectangular loop member, and said biasing means is in the form of a spring having a portion resiliently firmly bearing against an end portion of said female coupling loop member.

4. The combination of claim 3 wherein the female coupling further includes a mounting plate secured to the underside of said frame, said plate having a semi-cylindrical loop-receiving portion through which said end portion of said coupling loop extends.

5. Material handling apparatus comprising at least two dollies disposed in end-for-end adjacency, the proximate end of one of said dollies having a downwardly extending pinlike male coupling member, the other dolly at its proximate end having a generally rectangular loop at its underside for engagement about said pinlike member, and means for maintaining said loop in various adjusted angular positions, the location of the pinlike member on said one dolly and the formation of said loop on the other dolly being such to accommodate insertion between the adjacent dolly ends of a handling hook member for manipulation of the loop to a substantially horizontal projecting position in which it surrounds the pinlike member, whereby the two dollies are and remain coupled although at such spacing thereof.

References Cited by the Examiner

UNITED STATES PATENTS

| | | | |
|---|---|---|---|
| 1,098,262 | 5/14 | Hollingshead | 280—32.6 |
| 1,122,734 | 12/14 | Grabany | 213—175 |
| 1,197,007 | 9/16 | Bulley | 280—408 |
| 2,610,750 | 9/52 | Hulbert | 280—33.99 X |
| 2,633,615 | 4/53 | Donovan | 24—252 |

FOREIGN PATENTS

| | | |
|---|---|---|
| 203,991 | 9/23 | Great Britain. |
| 462,999 | 12/13 | France. |
| 730,220 | 12/42 | Germany. |
| 115,752 | 9/42 | Australia. |

A. HARRY LEVY, *Primary Examiner.*

PHILIP ARNOLD, *Examiner.*